(12) United States Patent
Dunn

(10) Patent No.: US 12,325,382 B2
(45) Date of Patent: Jun. 10, 2025

(54) LADDER-MOUNTED STORAGE SYSTEM

(71) Applicant: Donald Dunn, Colfax, CA (US)

(72) Inventor: Donald Dunn, Colfax, CA (US)

( * ) Notice: Subject to any disclaimer, the term of this patent is extended or adjusted under 35 U.S.C. 154(b) by 290 days.

(21) Appl. No.: 18/127,597

(22) Filed: Mar. 28, 2023

(65) Prior Publication Data

US 2024/0326705 A1 Oct. 3, 2024

(51) Int. Cl.
 *B60R 9/06* (2006.01)

(52) U.S. Cl.
 CPC .................................. *B60R 9/065* (2013.01)

(58) Field of Classification Search
 CPC .. B60R 9/065; B60R 11/06; B60R 2011/0059
 USPC ............ 224/560, 558, 276; 248/211, 229.12, 248/229.22
 See application file for complete search history.

(56) References Cited

U.S. PATENT DOCUMENTS

| | | | | |
|---|---|---|---|---|
| 2,150,709 A * | 3/1939 | Bake | ...................... | B60N 3/005 |
| | | | | 224/276 |
| 4,671,438 A * | 6/1987 | La Plante | .................. | B62J 9/27 |
| | | | | 224/438 |
| 5,024,359 A * | 6/1991 | Thomas | ...................... | B62J 7/06 |
| | | | | 224/435 |
| 5,797,571 A * | 8/1998 | Brophy | ...................... | E06C 7/14 |
| | | | | 248/210 |
| 5,996,736 A * | 12/1999 | Stankiewicz | ......... | B60R 9/0485 |
| | | | | 182/127 |
| 6,845,895 B2 * | 1/2005 | Jones | ........................ | A45C 9/00 |
| | | | | 224/330 |
| 8,028,877 B2 * | 10/2011 | Lien | ........................... | B62J 9/27 |
| | | | | 224/419 |
| 8,292,139 B2 * | 10/2012 | Golub | ........................ | B62J 7/08 |
| | | | | 224/558 |
| 9,056,641 B2 * | 6/2015 | Visenzi | ....................... | B62J 9/23 |
| 10,731,866 B2 * | 8/2020 | Heffel | ...................... | F24C 15/16 |
| 11,267,491 B2 * | 3/2022 | Evans | ....................... | B61C 17/12 |
| 11,535,168 B2 * | 12/2022 | Dunn | ....................... | B60R 9/065 |
| 11,608,134 B2 * | 3/2023 | Ortlieb | ........................ | B62J 7/04 |
| 11,933,338 B2 * | 3/2024 | Adler | ....................... | F16B 2/185 |
| 2009/0014489 A1 * | 1/2009 | Settelmayer | ............ | B60R 9/058 |
| | | | | 224/558 |
| 2016/0377223 A1 * | 12/2016 | Heffel | ...................... | F24C 15/16 |
| | | | | 248/215 |
| 2024/0326705 A1 * | 10/2024 | Dunn | ....................... | B60R 9/065 |

* cited by examiner

*Primary Examiner* — Justin M Larson
(74) *Attorney, Agent, or Firm* — The Iwashko Law Firm, PLLC; Lev Ivan Gabriel Iwashko

(57) ABSTRACT

A ladder-mounted storage system, including a ladder-mounted storage container to store at least one item therein, a plurality of ladder-mounted fasteners disposed on at least a portion of the ladder-mounted storage container to removably connect the ladder-mounted storage container to a ladder of a vehicle and prevent movement of the ladder-mounted storage container while the plurality of ladder-mounted fasteners are locked against at least one rung of the ladder, and a plurality of reinforcement rails disposed on at least a portion of the ladder-mounted storage container to dampen an impact of the ladder-mounted storage container against the ladder and prevent damage to the ladder-mounted storage container while the ladder-mounted storage container is connected to the ladder.

19 Claims, 10 Drawing Sheets

LADDER-MOUNTED STORAGE SYSTEM

BACKGROUND

1. Field

The present general inventive concept relates generally to a storage container, and particularly, to a ladder-mounted storage system.

2. Description of the Related Art

Recreational vehicles (RV) are large vehicles with different facilities for sleeping, cooking, and toiletries. RVs are often used to provide living accommodations during travel. However, some people use RVs for a full-time residence because it is a cheaper option than home ownership, as well as, offers a nomadic lifestyle.

Although large in size, RVs have limited space for storage and present a challenge for people with multiple occupants and/or items. Typically, an owner of the RV will have to install drawers, pocket organizers, magnets, and/or adhesives (e.g., attachments to walls) to increase storage space. Unfortunately, these items just add additional clutter within the RV.

Another consideration is using an external storage unit on a roof of the RV. Yet, placing the external storage unit on the roof is unstable and difficult to secure. Moreover, the roof requires the owner and/or another user to climb up onto the roof of the RV before the external storage unit can be retrieved. As such, a person climbing up on the roof risks injury.

Therefore, there is a need for a ladder-mounted storage system that provides a secure storage option and accommodates different types of items.

SUMMARY

The present general inventive concept provides a ladder-mounted storage system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a ladder-mounted storage system, including a ladder-mounted storage container to store at least one item therein, a plurality of ladder-mounted fasteners disposed on at least a portion of the ladder-mounted storage container to removably connect the ladder-mounted storage container to a ladder of a vehicle and prevent movement of the ladder-mounted storage container while the plurality of ladder-mounted fasteners are locked against at least one rung of the ladder, and a plurality of reinforcement rails disposed on at least a portion of the ladder-mounted storage container to dampen an impact of the ladder-mounted storage container against the ladder and prevent damage to the ladder-mounted storage container while the ladder-mounted storage container is connected to the ladder.

The ladder-mounted storage container may include a container body, a first top fastener connector disposed within at least a portion of the container body, a second top fastener connector disposed within at least a portion of the container body, and at least one bottom fastener connector disposed within at least a portion of the container body.

The first top fastener connector and the second top fastener connector, may each include a connector track to receive a fastener therein, and a plurality of connector teeth disposed on at least one side of the connector track.

The first top fastener connector and the second top fastener connector, may each further include a plurality of connector flaps movably disposed on at least a portion of the connector track to at least partially cover the connector track therein.

The first top fastener connector and the second top fastener connector, may each further include a top receiving channel disposed on a first side of the connector track to form a first channel within the connector track, and a bottom receiving channel disposed on a second side of the connector track to form a second channel within the connector track.

The plurality of ladder-mounted fasteners may include a first top ladder-mounted fastener disposed within at least a portion of the connector track to removably connect to the at least one rung of the ladder, and a second top ladder-mounted fastener disposed within at least a portion of the connector track to removably connect to the at least one rung of the ladder.

The first top ladder-mounted fastener and the second top ladder-mounted fastener may each include a fastener body, a fastener rail disposed on at least a portion of the fastener body to removably connect the fastener body to the connector track, a protruding connector disposed on at least a portion of the fastener body to connect the fastener body to the fastener rail, a top pin movably disposed on at least a portion of the protruding connector to connect to at least one of the plurality of connector teeth and prevent movement of at least one of the fastener body, the fastener rail, and the protruding connector while the top pin remains extended against at least one of the plurality of connector teeth, a bottom pin movably disposed on at least a portion of the protruding connector to connect to at least one of the plurality of connector teeth and prevent movement of at least one of the fastener body, the fastener rail, and the protruding connector while the bottom pin remains extended against at least one of the plurality of connector teeth, and a top release button movably disposed on at least a portion of the fastener body to retract the top pin and the bottom pin within the protruding connector in response to being depressed.

The top pin and the bottom pin may automatically retract in response to moving the fastener body, the fastener rail, and the protruding connector in a lateral direction away from a center of the container body.

The at least one bottom fastener connector may include a bottom connector track to receive a fastener therein, and a plurality of bottom connector teeth disposed on at least one side of the connector track.

The at least one bottom fastener connector may further include a plurality of bottom connector flaps movably disposed on at least a portion of the bottom connector track to at least partially cover the bottom connector track therein.

The at least one bottom fastener connector may further include a first bottom receiving channel disposed on a first side of the bottom connector track to form a first channel within the bottom connector track, and a second bottom receiving channel disposed on a second side of the bottom connector track to form a second channel within the bottom connector track.

The plurality of ladder-mounted fasteners may include at least one bottom ladder-mounted fastener disposed within at least a portion of the bottom connector track to removably connect to at least one second rung of the ladder.

The at least one bottom ladder-mounted fastener may include a bottom fastener body, a bottom fastener rail disposed on at least a portion of the bottom fastener body to removably connect the bottom fastener body to the bottom connector track, a bottom protruding connector disposed on at least a portion of the bottom fastener body to connect the bottom fastener body to the bottom fastener rail, a first bottom pin movably disposed on at least a portion of the bottom protruding connector to connect to at least one of the plurality of bottom connector teeth and prevent movement of at least one of the bottom fastener body, the bottom fastener rail, and the bottom protruding connector while the first bottom pin remains extended against at least one of the plurality of bottom connector teeth, a second bottom pin movably disposed on at least a portion of the bottom protruding connector to connect to at least one of the plurality of bottom connector teeth and prevent movement of at least one of the bottom fastener body, the bottom fastener rail, and the bottom protruding connector while the bottom pin remains extended against at least one of the plurality of bottom connector teeth, and a bottom release button movably disposed on at least a portion of the bottom fastener body to retract the first bottom pin and the second bottom pin within the bottom protruding connector in response to being depressed.

The first bottom pin and the second bottom pin may automatically retract in response to moving the bottom fastener body, the bottom fastener rail, and the bottom protruding connector in a lateral direction toward a center of the container body.

The at least one bottom ladder-mounted fastener may further include a lock disposed on at least a portion of the bottom release button to prevent movement the bottom release button in response to being locked, and allow the bottom release button to be depressed in response to being unlocked.

Each of the plurality of reinforcement rails may include a support body disposed on at least a portion of the container body to protrude away from the container body, and a protection surface disposed on at least a portion of the support body to dampen an impact thereon.

The plurality of reinforcement rails may protrude away from the container body at a distance greater than a distance of a rear portion of each of the plurality of ladder-mounted fasteners protrude from the container body.

At least two of the plurality of ladder-mounted fasteners may contact a different rung of the ladder than a third of the plurality of ladder-mounted fasteners.

At least two of the plurality of ladder-mounted fasteners may move in a different direction than a third of the plurality of ladder-mounted fasteners.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
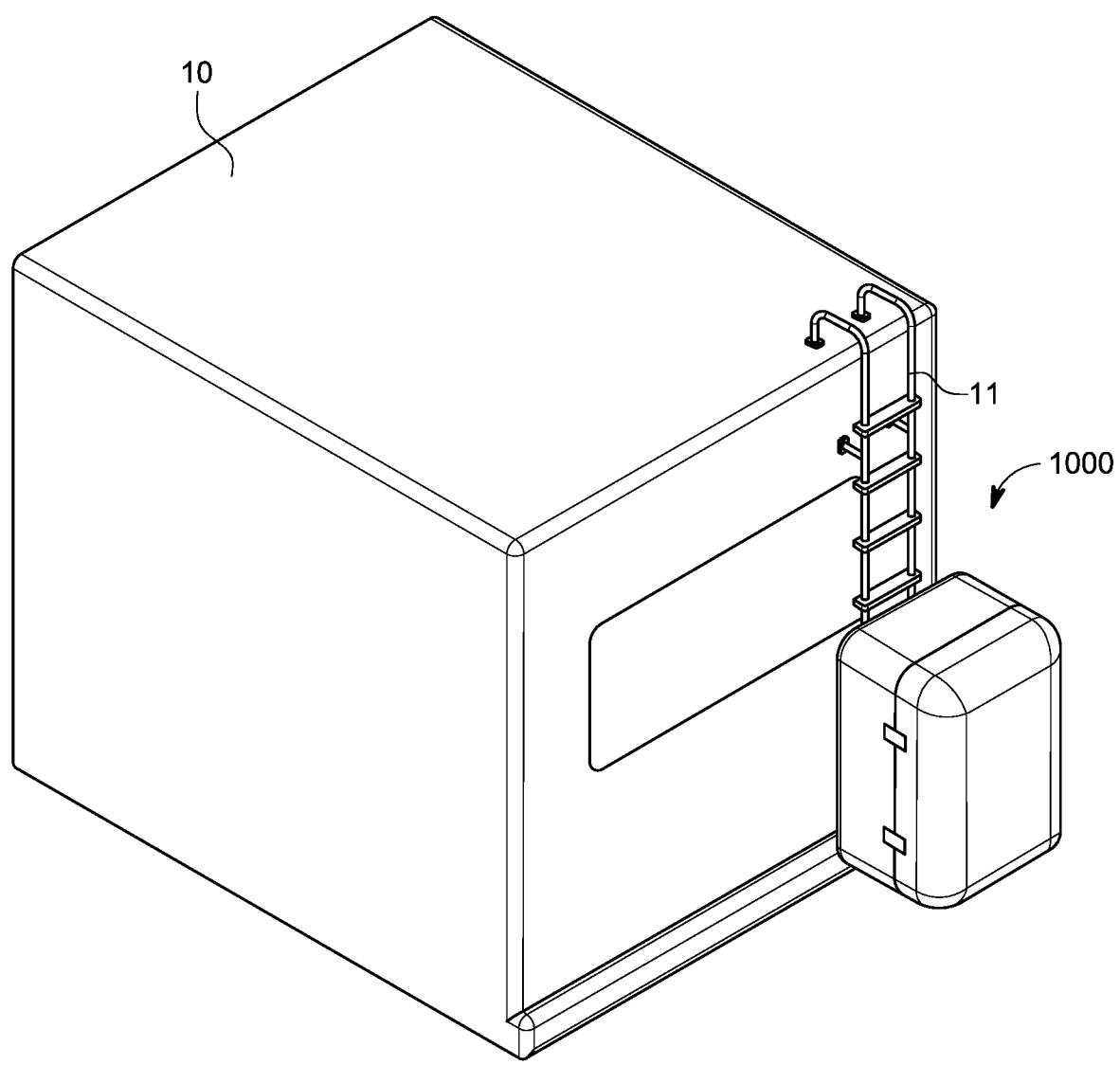
FIG. 1 illustrates an isometric view of a ladder-mounted storage system as disposed on a ladder of a vehicle, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including,"

when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Ladder-Mounted Storage System 1000
Ladder-Mounted Storage Container 1100
Container Body 1110
First Top Fastener Connector 1120
First Connector Track 1121
First Connector Flaps 1122
First Connector Teeth 1123
First Top Receiving Channel 1124
First Bottom Receiving Channel 1125
Second Top Fastener Connector 1130
Second Connector Track 1131
Second Connector Flaps 1132
Second Connector Teeth 1133
Second Top Receiving Channel 1134
Second Bottom Receiving Channel 1135
Bottom Fastener Connector 1140
Bottom Connector Track 1141
Bottom Connector Flaps 1142
Bottom Connector Teeth 1143
First Bottom Receiving Channel 1144
Second Bottom Receiving Channel 1145
Ladder-Mounted Fasteners 1200
First Top Ladder-Mounted Fastener 1210
First Fastener Body 1211
First Fastener Rail 1212
First Protruding Connector 1213
First Top Pin 1214
First Bottom Pin 1215
First Top Release Button 1216
Second Top Ladder-Mounted Fastener 1220
Second Fastener Body 1221
Second Fastener Rail 1222
Second Protruding Connector 1223
Second Top Pin 1224
Second Bottom Pin 1225
Second Top Release button 1226
Bottom Ladder-Mounted Fastener 1230
Bottom Fastener Body 1231
Bottom Fastener Rail 1232
Bottom Protruding Connector 1233
First Bottom Pin 1234
Second Bottom Pin 1235
Bottom Release Button 1236
Lock 1237
Reinforcement Rails 1300
First Reinforcement Rail 1310
First Support Body 1311
First Protection Surface 1312
Second Reinforcement Rail 1320
Second Support Body 1321
Second Protection Surface 1322

FIG. 1 illustrates an isometric view of a ladder-mounted storage system 1000 as disposed on a ladder 11 of a vehicle 10, according to an exemplary embodiment of the present general inventive concept.

The ladder-mounted storage system 1000 may be constructed from at least one of metal, plastic, wood, ceramic, glass, vinyl, canvas, and rubber, etc., but is not limited thereto. Additionally, the ladder-mounted storage system 1000 may be highly durable, weatherproof, waterproof, and/or fireproof.

Figure 2:
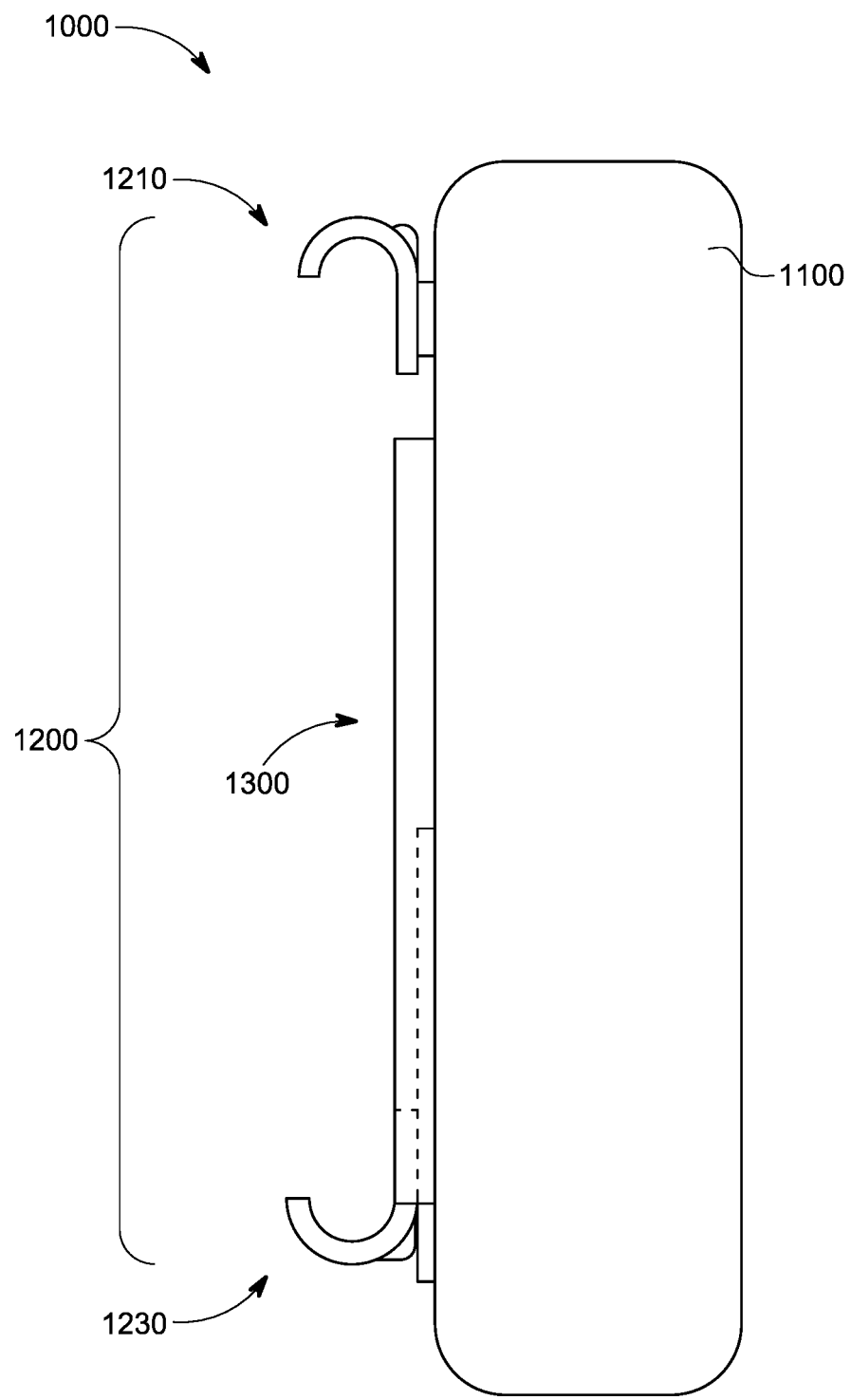
FIG. 2 illustrates an elevational side view of the ladder-mounted storage system, according to an exemplary embodiment of the present general inventive concept.

FIG. 2 illustrates an elevational side view of the ladder-mounted storage system 1000, according to an exemplary embodiment of the present general inventive concept.

Figure 3A:
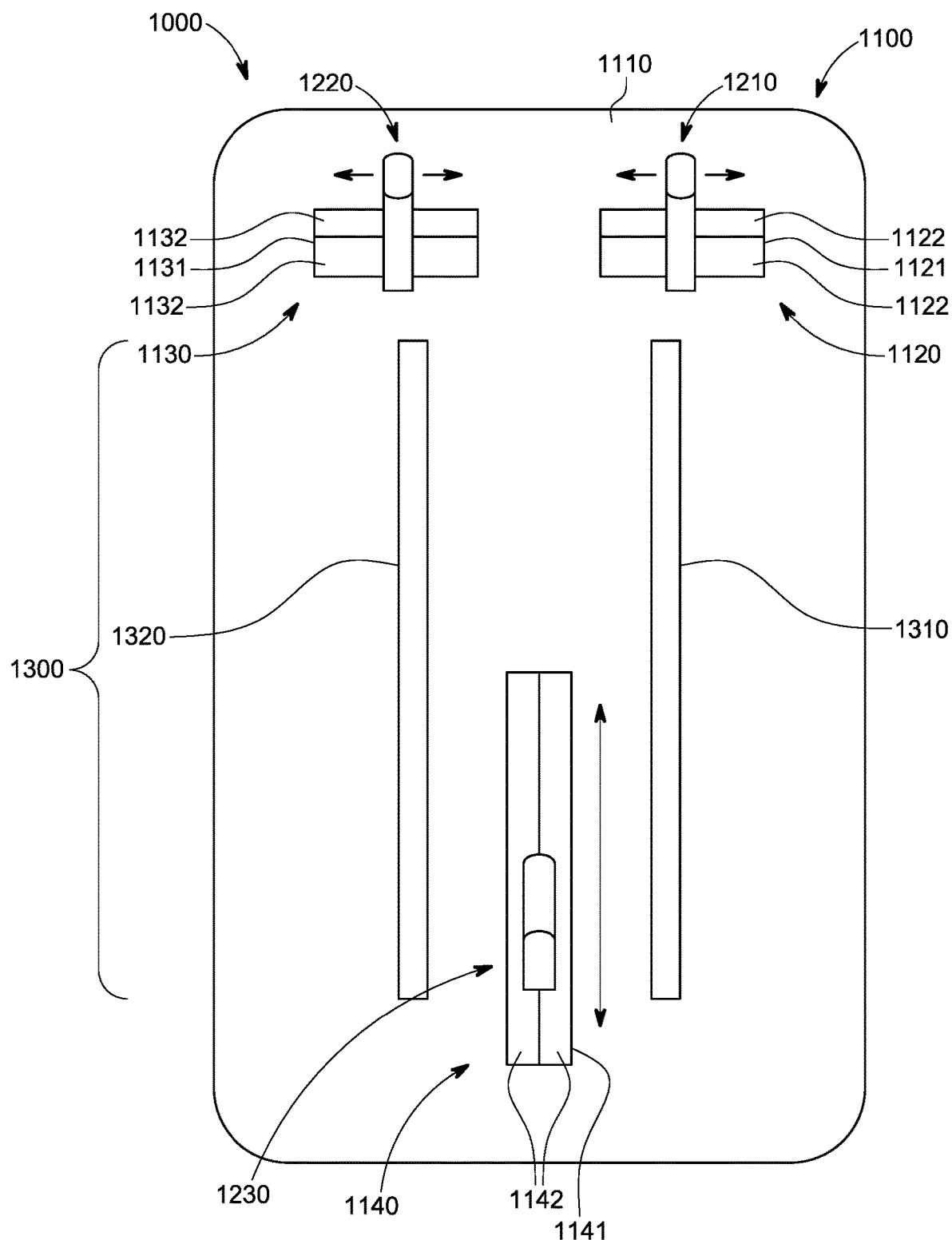
FIG. 3A illustrates an elevational rear view of the ladder-mounted storage system with a plurality of ladder-mounted fasteners disposed on a ladder-mounted storage container, according to an exemplary embodiment of the present general inventive concept.

FIG. 3A illustrates an elevational rear view of the ladder-mounted storage system 1000 with a plurality of ladder-mounted fasteners 1200 disposed on a ladder-mounted storage container 1100, according to an exemplary embodiment of the present general inventive concept.

Figure 3B:
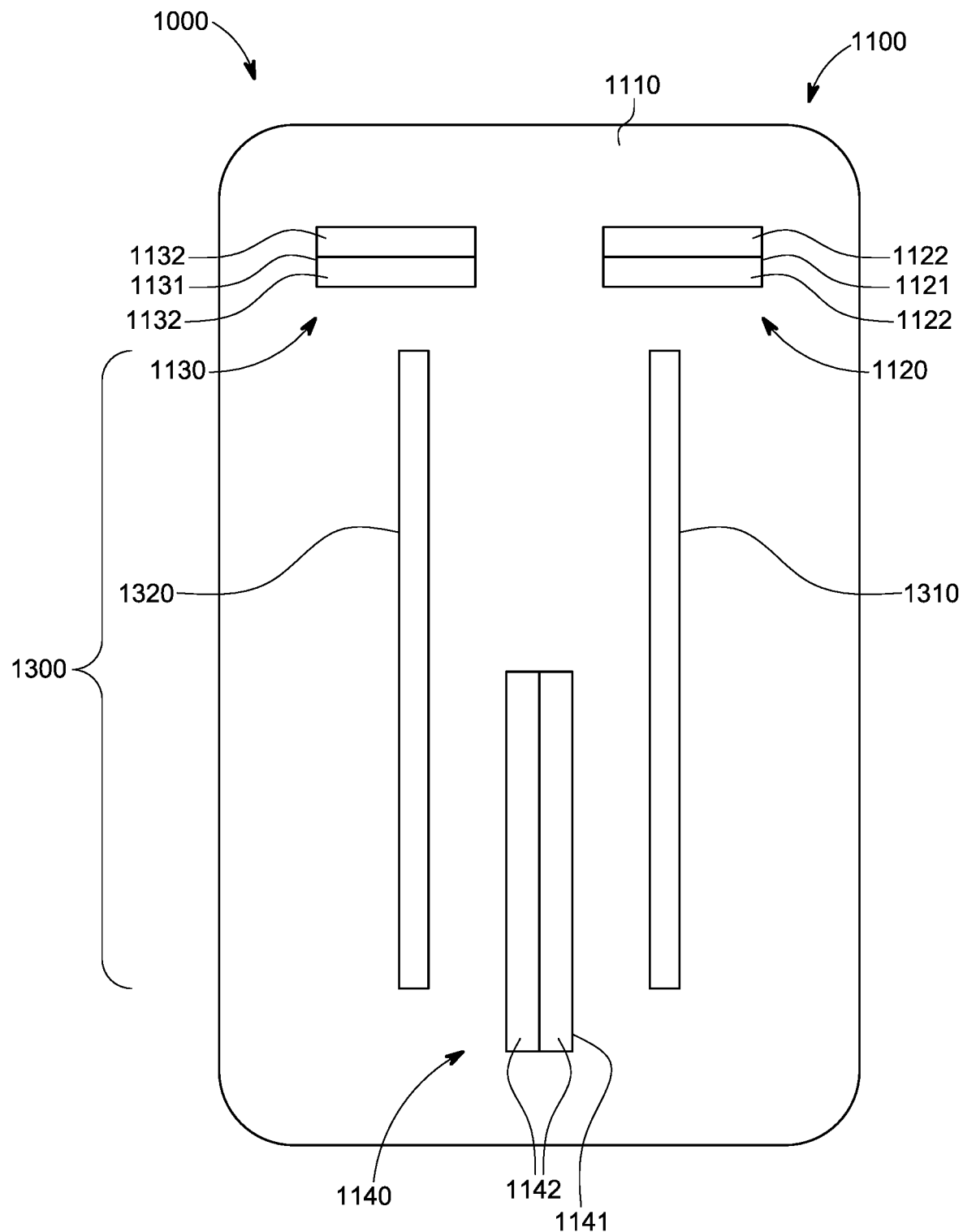
FIG. 3B illustrates an elevational rear view of the ladder-mounted storage container with the plurality of ladder-mounted fasteners removed, according to an exemplary embodiment of the present general inventive concept.

FIG. 3B illustrates an elevational rear view of the ladder-mounted storage container 1100 with the plurality of ladder-mounted fasteners 1200 removed, according to an exemplary embodiment of the present general inventive concept.

Figure 3C:
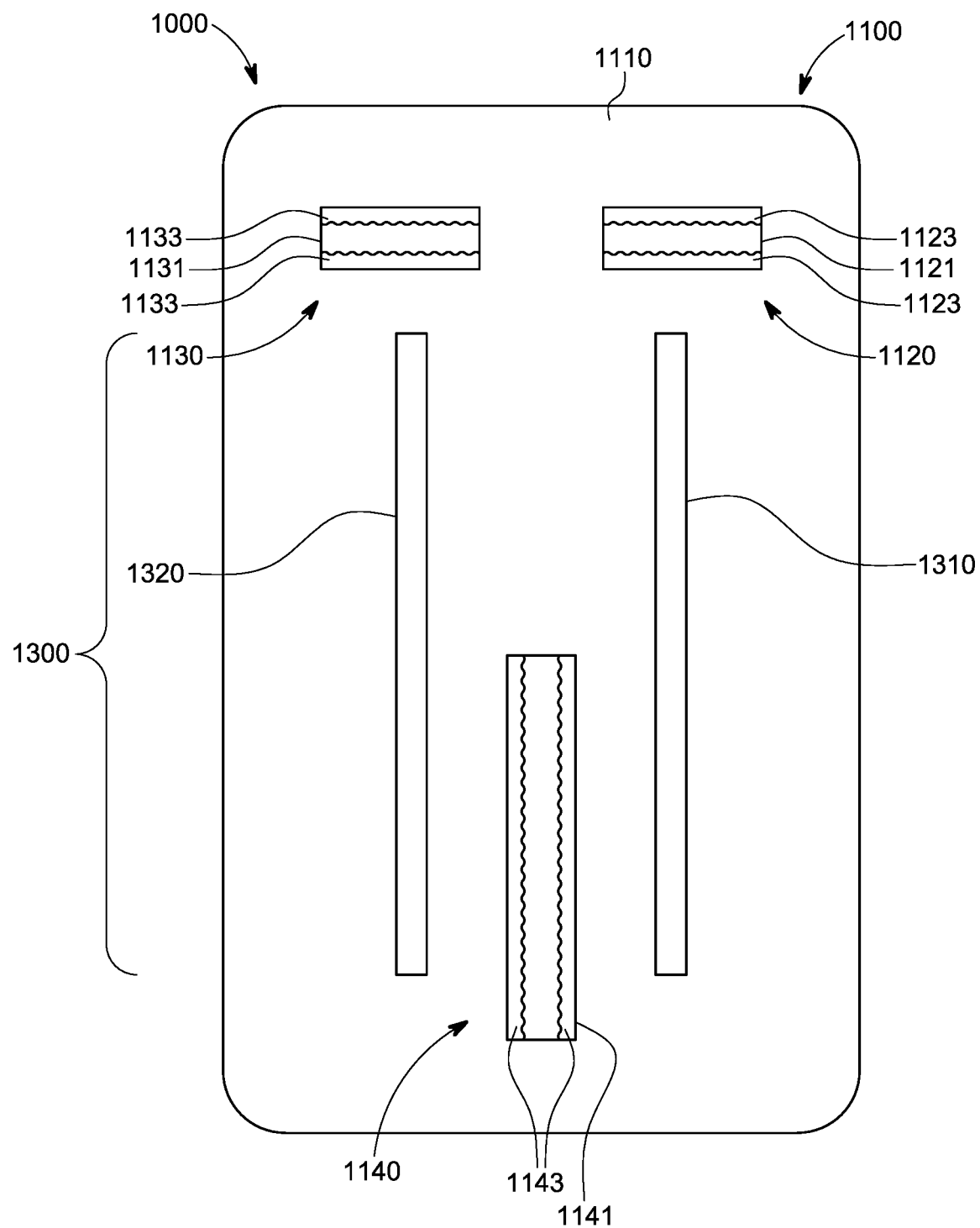
FIG. 3C illustrates an elevational rear view of the ladder-mounted storage container and a sectional view of the plurality of ladder-mounted fasteners, according to an exemplary embodiment of the present general inventive concept.

FIG. 3C illustrates an elevational rear view of the ladder-mounted storage container 1100 and a sectional view of the plurality of ladder-mounted fasteners 1200, according to an exemplary embodiment of the present general inventive concept.

The ladder-mounted storage system 1000 may include a ladder-mounted storage container 1100, a plurality of ladder-mounted fasteners 1200, and a plurality of reinforcement rails 1300, but is not limited thereto.

Referring to FIGS. 1 through 3C, the ladder-mounted storage container 1100 is illustrated to have a rounded rectangular prism shape. However, the ladder-mounted storage container 1100 may be rectangular, circular, conical, triangular, pentagonal, hexagonal, heptagonal, octagonal, or any other shape known to one of ordinary skill in the art, but is not limited thereto.

The ladder-mounted storage container 1100 may include a container body 1110, a first top fastener connector 1120, a second top fastener connector 1130, and at least one bottom fastener connector 1140, but is not limited thereto.

The container body 1110 may be removably connected (i.e., mounted) to at least a portion of a ladder 11 of a vehicle 10, such as a recreational vehicle (RV). The container body 1110 may receive and/or store at least one item therein.

Figure 4:
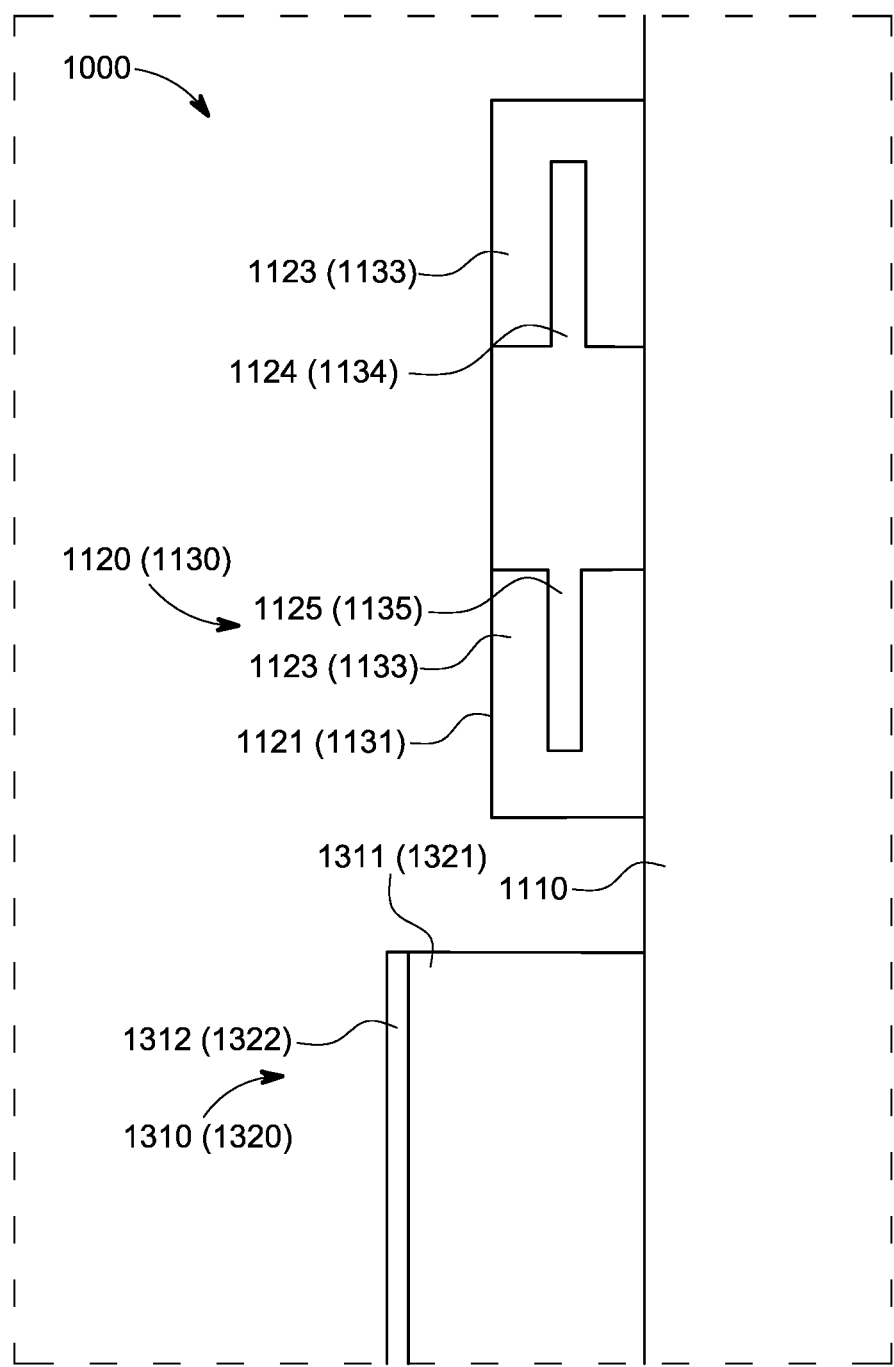
FIG. 4 illustrates an elevational sectional side view of a top portion of the ladder-mounted storage system, according to an exemplary embodiment of the present general inventive concept.

FIG. 4 illustrates an elevational sectional side view of a top portion of the ladder-mounted storage system 1000, according to an exemplary embodiment of the present general inventive concept.

Referring to FIGS. 3A through 4, the first top fastener connector 1120 may include a first connector track 1121, a plurality of first connector flaps 1122, a plurality of first connector teeth 1123, a first top receiving channel 1124, and a first bottom receiving channel 1125, but is not limited thereto.

The first connector track 1121 may be disposed within at least a portion of a first end (e.g., top portion) of an interior of the container body 1110. The first connector track 1121 may receive and/or connect to a fastener. Moreover, the first connector track 1121 may facilitate movement of the fastener therein. The first connector track 1121 may be a single component or a plurality of components (i.e., sections).

Each of the plurality of first connector flaps 1122 may be constructed of rubber, but is not limited thereto.

Each of the plurality of first connector flaps 1122 may be movably disposed on at least a portion of the first connector track 1121. Additionally, each of the plurality of first connector flaps 1122 may be elastic, such that each of the plurality of first connector flaps 1122 may at least partially deform (i.e., bend, stretch, compress) in response to an application of force (e.g., pushing, pulling) thereto.

The plurality of first connector flaps 1122 may form a barrier over the first connector track 1121. In other words, the plurality of first connector flaps 1122 may at least partially cover and/or at least partially enclose the first connector track 1121 therein.

The plurality of first connector teeth 1123 may be constructed of metal, metallic alloy, and/or plastic, but is not limited thereto.

Each of the plurality of first connector teeth 1123 may be a jagged surface and/or ridged surface (e.g., zig zag appearance, bump appearance). A first of the plurality of first connector teeth 1123 may be disposed on a first side of the first connector track 1121 and a second of the plurality of first connector teeth 1123 may be disposed on a second side of the first connector track 1121 opposite with respect to the first side of the first connector track 1121.

The first top receiving channel 1124 may be disposed on the first side of the first connector track 1121. The first top receiving channel 1124 may form a channel and/or a groove within the first connector track 1121.

The first bottom receiving channel 1125 may be disposed on the second side of the first connector track 1121 opposite with respect to the first side of the first connector track 1121. The first bottom receiving channel 1125 may form a channel and/or a groove within the first connector track 1121.

Referring to FIGS. 3A through 4, the second top fastener connector 1130 may include a second connector track 1131, a plurality of second connector flaps 1132, a plurality of second connector teeth 1133, a second top receiving channel 1134, and a second bottom receiving channel 1135, but is not limited thereto.

The second connector track 1131 may be disposed within at least a portion of the first end (e.g., top portion) of the interior of the container body 1110. Also, the second connector track 1131 may be disposed at a first distance away from the first connector track 1121. The second connector track 1131 may receive and/or connect to a fastener. Moreover, the second connector track 1131 may facilitate movement of the fastener therein. The second connector track 1131 may be a single component or a plurality of components (i.e., sections).

Each of the plurality of second connector flaps 1132 may be constructed of rubber, but is not limited thereto.

Each of the plurality of second connector flaps 1132 may be movably disposed on at least a portion of the second connector track 1131. Additionally, each of the plurality of second connector flaps 1132 may be elastic, such that each of the plurality of second connector flaps 1132 may at least partially deform (i.e., bend, stretch, compress) in response to an application of force (e.g., pushing, pulling) thereto.

The plurality of second connector flaps 1132 may form a barrier over the second connector track 1131. In other words, the plurality of second connector flaps 1132 may at least partially cover and/or at least partially enclose the second connector track 1131 therein.

The plurality of second connector teeth 1133 may be constructed of metal, metallic alloy, and/or plastic, but is not limited thereto.

Each of the plurality of second connector teeth 1133 may be a jagged surface and/or ridged surface (e.g., zig zag appearance, bump appearance). A first of the plurality of second connector teeth 1133 may be disposed on a first side of the second connector track 1131 and a second of the plurality of second connector teeth 1133 may be disposed on a second side of the second connector track 1131 opposite with respect to the first side of the second connector track 1131.

The second top receiving channel 1134 may be disposed on the first side of the second connector track 1131. The second top receiving channel 1134 may form a channel and/or a groove within the second connector track 1131.

The second bottom receiving channel 1135 may be disposed on the second side of the second connector track 1131 opposite with respect to the first side of the second connector track 1131. The second bottom receiving channel 1135 may form a channel and/or a groove within the second connector track 1131.

Figure 5:
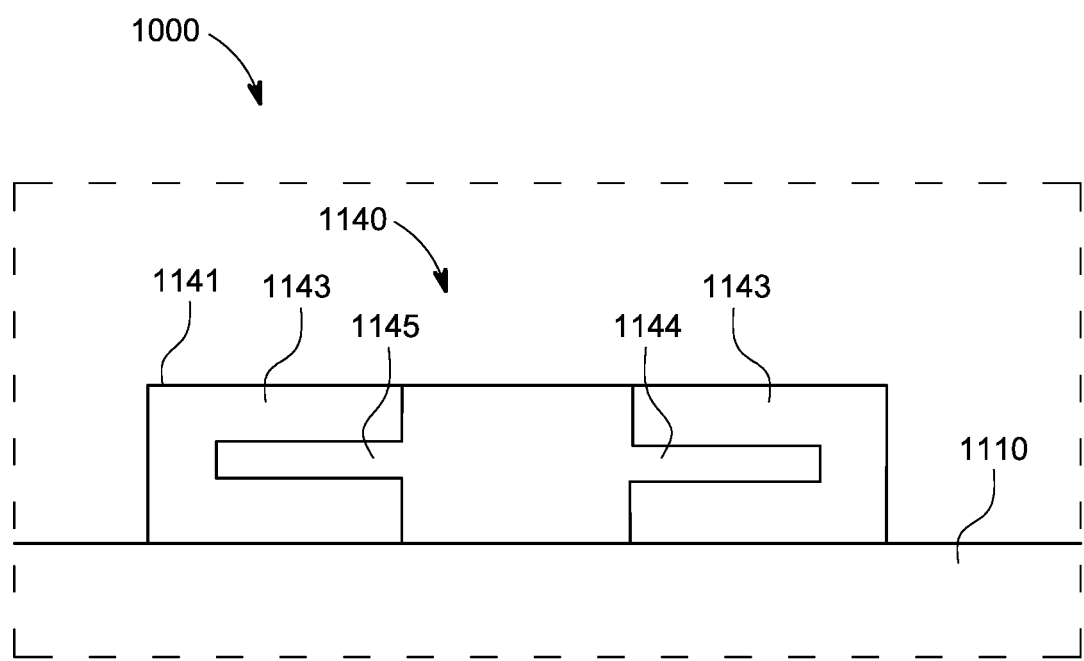
FIG. 5 illustrates an elevational sectional bottom view of the ladder-mounted storage system, according to an exemplary embodiment of the present general inventive concept.

FIG. 5 illustrates an elevational sectional bottom view of the ladder-mounted storage system 1000, according to an exemplary embodiment of the present general inventive concept.

Referring to FIGS. 3A through 5, the at least one bottom fastener connector 1140 may include a bottom connector track 1141, a plurality of bottom connector flaps 1142, a plurality of bottom connector teeth 1143, a first bottom receiving channel 1144, and a second bottom receiving channel 1145, but is not limited thereto.

The bottom connector track 1141 may be disposed within at least a portion of a center of a second end (e.g., bottom portion) of the interior of the container body 1110. Also, the bottom connector track 1141 may be disposed at a second distance away from the first connector track 1121 and/or the second connector track 1131. The bottom connector track 1141 may receive and/or connect to a fastener. Moreover, the bottom connector track 1141 may facilitate movement of the fastener therein. The bottom connector track 1141 may be a single component or a plurality of components (i.e., sections).

Each of the plurality of bottom connector flaps 1142 may be constructed of rubber, but is not limited thereto.

Each of the plurality of bottom connector flaps 1142 may be movably disposed on at least a portion of the bottom connector track 1141. Additionally, each of the plurality of bottom connector flaps 1142 may be elastic, such that each of the plurality of bottom connector flaps 1142 may at least partially deform (i.e., bend, stretch, compress) in response to an application of force (e.g., pushing, pulling) thereto.

The plurality of bottom connector flaps 1142 may form a barrier over the bottom connector track 1141. In other words, the plurality of bottom connector flaps 1142 may at least partially cover and/or at least partially enclose the bottom connector track 1141 therein.

The plurality of bottom connector teeth 1143 may be constructed of metal, metallic alloy, and/or plastic, but is not limited thereto.

Each of the plurality of bottom connector teeth 1143 may be a jagged surface and/or ridged surface (e.g., zig zag appearance, bump appearance). A first of the plurality of bottom connector teeth 1143 may be disposed on a first side of the bottom connector track 1141 and a second of the plurality of bottom connector teeth 1143 may be disposed on a second side of the bottom connector track 1141 opposite with respect to the first side of the bottom connector track 1141.

The first bottom receiving channel 1144 may be disposed on the first side of the bottom connector track 1141. The first bottom receiving channel 1144 may form a channel and/or a groove within the bottom connector track 1141.

The second bottom receiving channel 1145 may be disposed on the second side of the bottom connector track 1141 opposite with respect to the first side of the bottom connector track 1141. The second bottom receiving channel 1145 may form a channel and/or a groove within the bottom connector track 1141.

Figure 6:
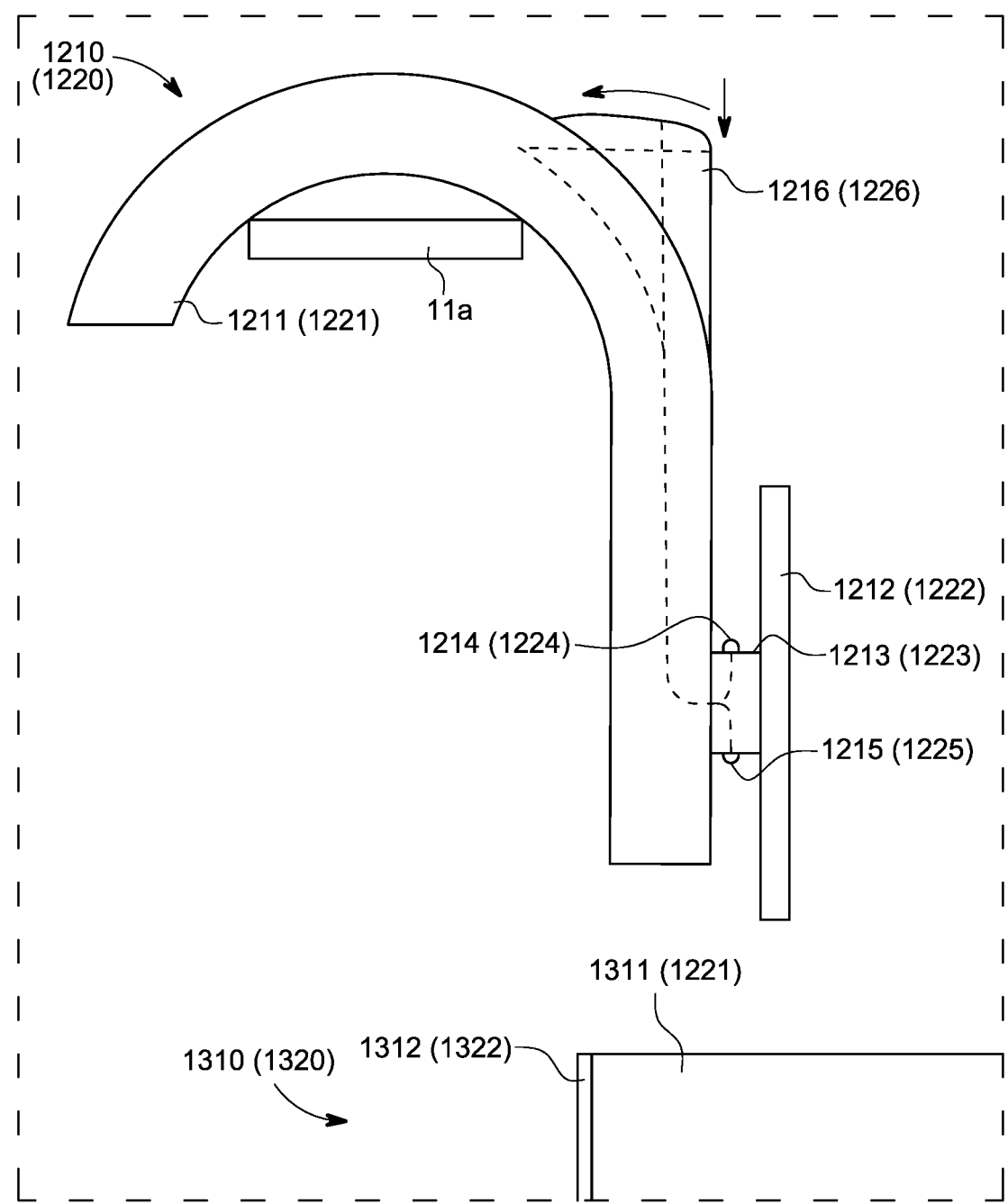
FIG. 6 illustrates a zoomed in view of one of a plurality of top ladder-mounted fasteners, according to an exemplary embodiment of the present general inventive concept.

FIG. 6 illustrates a zoomed in view of one of a plurality of top ladder-mounted fasteners 1200, according to an exemplary embodiment of the present general inventive concept.

The plurality of ladder-mounted fasteners 1200 may include a first top ladder-mounted fastener 1210, a second top ladder-mounted fastener 1220, and at least one bottom ladder-mounted fastener 1230, but is not limited thereto.

The first top ladder-mounted fastener 1210 may include a first fastener body 1211, a first fastener rail 1212, a first protruding connector 1213, a first top pin 1214, a first bottom pin 1215, and a first top release button 1216, but is not limited thereto.

Referring to FIG. 6, the first fastener body 1211 is illustrated to be a hook. However, the first fastener body 1211 may be a clamp, a clip, a clasp, a cord, a wire, and/or any combination thereof, but is not limited thereto.

The first fastener body 1211 may be removably connected (e.g., without tools, fasteners, screws, bolts, nails, washers, etc.) to the first connector track 1121. Additionally, the first fastener body 1211 may removably connect (e.g., hook on) to a first rung 11*a* of the ladder 11.

The first fastener rail 1212 may removably connect the first fastener body 1211 to the first connector track 1121. More specifically, the first fastener rail 1212 may be removably inserted within the first top receiving channel 1124 and/or the first bottom receiving channel 1125. Thus, a size (i.e., a length, a width) and/or a shape of the first fastener rail 1212 may correspond to a size (i.e., a length, a width) and/or a shape of the first top receiving channel 1124, and/or a size (i.e., a length, a width) and/or a shape of the first bottom receiving channel 1125. Accordingly, the first fastener rail 1212 may snugly fit within the first top receiving channel 1124 and/or the first bottom receiving channel 1125.

Furthermore, the first fastener rail 1212 may move (i.e., slide) in a first lateral direction or a second lateral direction with respect to the first top receiving channel 1124 and/or the first bottom receiving channel 1125 within the first connector track 1121. For example, the first fastener rail 1212 may linearly move along an entire length of the first top receiving channel 1124 and/or an entire length of the first bottom receiving channel 1125.

The first protruding connector 1213 may be disposed on at least a portion of the first fastener body 1211. The first protruding connector 1213 may connect the first fastener body 1211 to the first fastener rail 1212. As such, the first fastener body 1211 and/or the first protruding connector 1213 may move in response to movement of the first fastener rail 1212 within the first top receiving channel 1124 and/or the first bottom receiving channel 1125. Also, the first fastener body 1211, the first fastener rail 1212, and/or the first protruding connector 1213 may move in response to an application of force (e.g., pushing, pulling) thereto.

The first top pin 1214 may be movably disposed on at least a portion of the first protruding connector 1213. The first top pin 1214 may move from extended out of the first protruding connector 1213 in a first position (i.e., extended position) to retracted within the first protruding connector 1213 in a second position (i.e., retracted position). Conversely, the first top pin 1214 may move from retracted within the first protruding connector 1213 in the second position to extended out of the first protruding connector 1213 in the first position.

The first bottom pin 1215 may be movably disposed on at least a portion of the first protruding connector 1213. The first bottom pin 1215 may move from extended out of the first protruding connector 1213 in a first position (i.e., extended position) to retracted within the first protruding connector 1213 in a second position (i.e., retracted position). Conversely, the first bottom pin 1215 may move from retracted within the first protruding connector 1213 in the second position to extended out of the first protruding connector 1213 in the first position.

The first top release button 1216 may be movably disposed on at least a portion of the first fastener body 1211 and/or connected to the first top pin 1214 and/or the first bottom pin 1215. Referring again to FIG. 6, the first top release button 1216 may move from a curved edge of the first fastener body 1211 toward the first fastener rail 1212 in response to being depressed. Alternatively, the first top release button 1216 may move from a first end of the curved edge to a second side of the curved edge in response to being depressed.

During use, the first top pin 1214 and/or the first bottom pin 1215 may be extended to connect to at least one of the plurality of first connector teeth 1123. As such, the first top pin 1214 and/or the first bottom pin 1215 may prevent movement of the first fastener body 1211, the first fastener rail 1212, and/or the first protruding connector 1213 while the first top pin 1214 and/or the first bottom pin 1215 remain extended against at least one of the plurality of first connector teeth 1123.

The first top pin 1214 and/or the first bottom pin 1215 may retract within the first protruding connector 1213 in response to depressing and holding the first top release button 1216. Thereafter, the first top pin 1214 and/or the first bottom pin 1215 may be extended (i.e., return to original position) in response to releasing the first top release button 1216. Thus, the first fastener body 1211 may be moved along the first rung 11*a* to contact a first edge 11*c* (i.e., first portion perpendicularly disposed with respect to the first rung 11*a*) of the ladder 11 to tighten and/or lock the first fastener body 1211 against the ladder 11, such that the first fastener body 1211 and/or the container body 1110 may be prevented from moving.

Alternatively, the first fastener body 1211, the first fastener rail 1212, and/or the first protruding connector 1213 may move in the first lateral direction or the second lateral direction, away from a center of the container body 1110 between the first top ladder-mounted fastener 1210 and/or the second top ladder-mounted fastener 1220. Moreover, the first fastener body 1211, the first fastener rail 1212, and/or the first protruding connector 1213 may move without depressing the first top release button 1216. However, the first fastener body 1211, the first fastener rail 1212, and/or the first protruding connector 1213 may only move in the aforementioned direction in absence of depressing the first top release button 1216. In other words, moving the first fastener body 1211, the first fastener rail 1212, and/or the first protruding connector 1213 away from the center of the container body 1110 may automatically retract the first top pin 1214 and/or the first bottom pin 1215, while moving the first fastener body 1211, the first fastener rail 1212, and/or the first protruding connector 1213 toward the center of the container body 1110 is prevented. Thus, the first top pin 1214 and/or the first bottom pin 1215 may operate similar to a ratchet. Thus, the first top pin 1214 and/or the first bottom pin 1215 may fully retract in response to depressing the first top release button 1216, which allows movement of the first fastener body 1211, the first fastener rail 1212, and/or the first protruding connector 1213 toward the center of the container body 1110.

The second top ladder-mounted fastener 1220 may include a second fastener body 1221, a second fastener rail 1222, a second protruding connector 1223, a second top pin 1224, a second bottom pin 1225, and a second top release button 1226, but is not limited thereto.

Referring to FIG. 6, the second fastener body 1221 is illustrated to be a hook. However, the second fastener body 1221 may be a clamp, a clip, a clasp, a cord, a wire, and/or any combination thereof, but is not limited thereto.

The second fastener body 1221 may be removably connected to the second connector track 1131. Additionally, the second fastener body 1221 may removably connect (e.g., hook on) to the first rung 11*a* of the ladder 11.

The second fastener rail 1222 may removably connect the second fastener body 1221 to the second connector track 1131. More specifically, the second fastener rail 1222 may be removably inserted within the second top receiving channel 1134 and/or the second bottom receiving channel 1135. Thus, a size (i.e., a length, a width) and/or a shape of the second fastener rail 1222 may correspond to a size (i.e., a length, a width) and/or a shape of the second top receiving channel 1134, and/or a size (i.e., a length, a width) and/or a shape of the second bottom receiving channel 1135. Accordingly, the second fastener rail 1222 may snugly fit within the second top receiving channel 1134 and/or the second bottom receiving channel 1135.

Furthermore, the second fastener rail 1222 may move (i.e., slide) in a first lateral direction or a second lateral direction with respect to the second top receiving channel 1134 and/or the second bottom receiving channel 1135 within the second connector track 1131. For example, the second fastener rail 1222 may linearly move along an entire length of the second top receiving channel 1134 and/or an entire length of the second bottom receiving channel 1135.

The second protruding connector 1223 may be disposed on at least a portion of the second fastener body 1221. The second protruding connector 1223 may connect the second fastener body 1221 to the second fastener rail 1222. As such, the second fastener body 1221 and/or the second protruding connector 1223 may move in response to movement of the second fastener rail 1222 within the second top receiving channel 1134 and/or the second bottom receiving channel 1135. Also, the second fastener body 1221, the second fastener rail 1222, and/or the second protruding connector 1223 may move in response to an application of force (e.g., pushing, pulling) thereto.

The second top pin 1224 may be movably disposed on at least a portion of the second protruding connector 1223. The second top pin 1224 may move from extended out of the second protruding connector 1223 in a first position (i.e., extended position) to retracted within the second protruding connector 1223 in a second position (i.e., retracted position). Conversely, the second top pin 1224 may move from retracted within the second protruding connector 1223 in the second position to extended out of the second protruding connector 1223 in the first position.

The second bottom pin 1225 may be movably disposed on at least a portion of the second protruding connector 1223. The second bottom pin 1225 may move from extended out of the second protruding connector 1223 in a first position (i.e., extended position) to retracted within the second protruding connector 1223 in a second position (i.e., retracted position). Conversely, the second bottom pin 1225 may move from retracted within the second protruding connector 1223 in the second position to extended out of the second protruding connector 1223 in the first position.

The second top release button 1226 may be movably disposed on at least a portion of the second fastener body 1221 and/or connected to the second top pin 1224 and/or the second bottom pin 1225. Referring again to FIG. 6, the second top release button 1226 may move from a curved edge of the second fastener body 1221 toward the second fastener rail 1222 in response to being depressed. Alternatively, the second top release button 1226 may move from a first end of the curved edge to a second side of the curved edge in response to being depressed.

During use, the second top pin 1224 and/or the second bottom pin 1225 may be extended to connect to at least one of the plurality of second connector teeth 1133. As such, the second top pin 1224 and/or the second bottom pin 1225 may prevent movement of the second fastener body 1221, the second fastener rail 1222, and/or the second protruding connector 1223 while the second top pin 1224 and/or the second bottom pin 1225 remain extended against at least one of the plurality of second connector teeth 1133.

The second top pin 1224 and/or the second bottom pin 1225 may retract within the second protruding connector 1223 in response to depressing and holding the second top release button 1226. Thereafter, the second top pin 1224 and/or the second bottom pin 1225 may be extended (i.e., return to original position) in response to releasing the second top release button 1226. Thus, the second fastener body 1221 may be moved along the first rung 11*a* to contact a second edge 11*d* (i.e., second portion perpendicularly disposed with respect to the first rung 11*a*) of the ladder 11 opposite with respect to the first edge of the ladder 11 to tighten and/or lock the second fastener body 1221 against the ladder 11, such that the second fastener body 1221 and/or the container body 1110 may be prevented from moving. It is important to note that the first fastener body 1211 and/or the second fastener body 1221 must be used jointly to form the lock against the ladder and prevent movement of the container body 1110.

Alternatively, the second fastener body 1221, the second fastener rail 1222, and/or the second protruding connector 1223 may move in the first lateral direction or the second lateral direction, away from a center of the container body 1110 between the first top ladder-mounted fastener 1210 and/or the second top ladder-mounted fastener 1220. Moreover, the second fastener body 1221, the second fastener rail 1222, and/or the second protruding connector 1223 may move without depressing the second top release button 1226. However, the second fastener body 1221, the second fastener rail 1222, and/or the second protruding connector 1223 may only move in the aforementioned direction in absence of depressing the second top release button 1226. In other words, moving the second fastener body 1221, the second fastener rail 1222, and/or the second protruding connector 1223 away from the center of the container body 1110 may automatically retract the second top pin 1224 and/or the second bottom pin 1225, while moving the second fastener body 1221, the second fastener rail 1222, and/or the second protruding connector 1223 toward the center of the container body 1110 is prevented. Thus, the second top pin 1224 and/or the second bottom pin 1225 may operate similar to a ratchet. Thus, the second top pin 1224 and/or the second bottom pin 1225 may fully retract in response to depressing the second top release button 1226, which allows movement of the second fastener body 1221, the second fastener rail 1222, and/or the second protruding connector 1223 toward the center of the container body 1110.

It is important to note that the movement of the second fastener body 1221, the second fastener rail 1222, and/or the second protruding connector 1223 away from the center of the container body 1110 is different and opposite to movement of the first fastener body 1211, the first fastener rail 1212, and/or the first protruding connector 1213 away from the center of the container body 1110.

Figure 7:
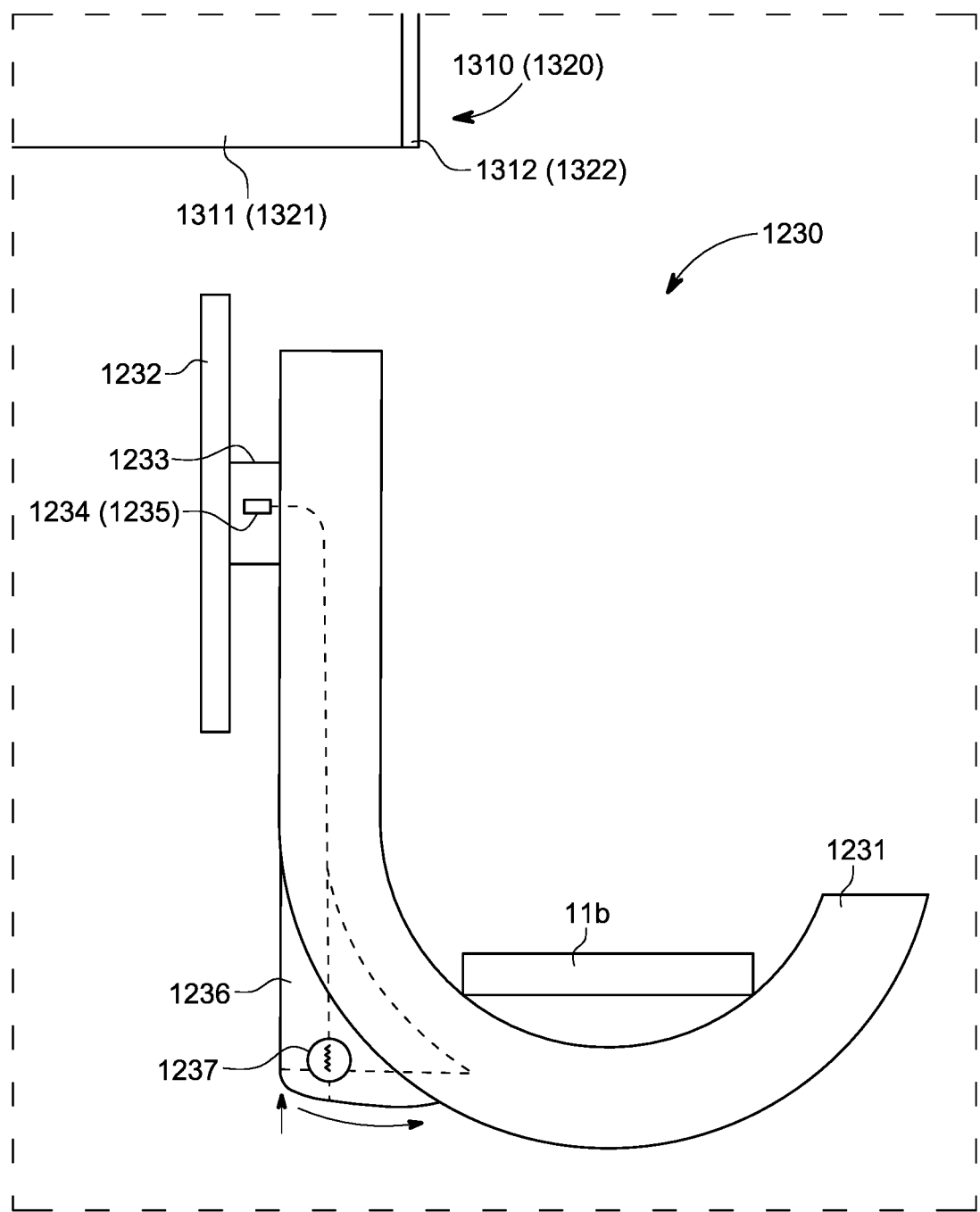
FIG. 7 illustrates a zoomed in view of a bottom ladder-mounted fastener, according to an exemplary embodiment of the present general inventive concept.

FIG. 7 illustrates a zoomed in view of a bottom ladder-mounted fastener 1230, according to an exemplary embodiment of the present general inventive concept.

The at least one bottom ladder-mounted fastener 1230 may include a bottom fastener body 1231, a bottom fastener rail 1232, a bottom protruding connector 1233, a first bottom pin 1234, a second bottom pin 1235, a bottom release button 1236, and a lock 1237, but is not limited thereto.

Referring to FIG. 7, the bottom fastener body 1231 is illustrated to be a hook. However, the bottom fastener body 1231 may be a clamp, a clip, a clasp, a cord, a wire, and/or any combination thereof, but is not limited thereto.

The bottom fastener body 1231 may be removably connected to the bottom connector track 1141. Additionally, the bottom fastener body 1231 may removably connect (e.g., hook on) to a second rung 11b of the ladder 11 different and distanced away from the first rung 11a.

The bottom fastener rail 1232 may removably connect the bottom fastener body 1231 to the bottom connector track 1141. More specifically, the bottom fastener rail 1232 may be removably inserted within the first bottom receiving channel 1144 and/or the second bottom receiving channel 1145. Thus, a size (i.e., a length, a width) and/or a shape of the bottom fastener rail 1232 may correspond to a size (i.e., a length, a width) and/or a shape of the first bottom receiving channel 1144, and/or a size (i.e., a length, a width) and/or a shape of the second bottom receiving channel 1145. Accordingly, the bottom fastener rail 1232 may snugly fit within the first bottom receiving channel 1144 and/or the second bottom receiving channel 1145.

Furthermore, the bottom fastener rail 1232 may move (i.e., slide) in a first orthogonal direction or a second orthogonal direction with respect to the first bottom receiving channel 1144 and/or the second bottom receiving channel 1145 within the bottom connector track 1141. For example, the bottom fastener rail 1232 may linearly move along an entire length of the first bottom receiving channel 1144 and/or an entire length of the second bottom receiving channel 1145.

The bottom protruding connector 1233 may be disposed on at least a portion of the bottom fastener body 1231. The bottom protruding connector 1233 may connect the bottom fastener body 1231 to the bottom fastener rail 1232. As such, the bottom fastener body 1231 and/or the bottom protruding connector 1233 may move in response to movement of the bottom fastener rail 1232 within the first bottom receiving channel 1144 and/or the second bottom receiving channel 1145. Also, the bottom fastener body 1231, the bottom fastener rail 1232, and/or the bottom protruding connector 1233 may move in response to an application of force (e.g., pushing, pulling) thereto.

The first bottom pin 1234 may be movably disposed on at least a portion of the bottom protruding connector 1233. The first bottom pin 1234 may move from extended out of the bottom protruding connector 1233 in a first position (i.e., extended position) to retracted within the bottom protruding connector 1233 in a second position (i.e., retracted position). Conversely, the first bottom pin 1234 may move from retracted within the bottom protruding connector 1233 in the second position to extended out of the bottom protruding connector 1233 in the first position.

The second bottom pin 1235 may be movably disposed on at least a portion of the bottom protruding connector 1233. The second bottom pin 1235 may move from extended out of the bottom protruding connector 1233 in a first position (i.e., extended position) to retracted within the bottom protruding connector 1233 in a second position (i.e., retracted position). Conversely, the second bottom pin 1235 may move from retracted within the bottom protruding connector 1233 in the second position to extended out of the bottom protruding connector 1233 in the first position.

The bottom release button 1236 may be movably disposed on at least a portion of the bottom fastener body 1231 and/or connected to the first bottom pin 1234 and/or the second bottom pin 1235. Referring again to FIG. 7, the bottom release button 1236 may move from a curved edge of the bottom fastener body 1231 toward the bottom fastener rail 1232 in response to being depressed. Alternatively, the bottom release button 1236 may move from a first end of the curved edge to a second side of the curved edge in response to being depressed.

During use, the first bottom pin 1234 and/or the second bottom pin 1235 may be extended to connect to at least one of the plurality of bottom connector teeth 1143. As such, the first bottom pin 1234 and/or the second bottom pin 1235 may prevent movement of the bottom fastener body 1231, the bottom fastener rail 1232, and/or the bottom protruding connector 1233 while the first bottom pin 1234 and/or the second bottom pin 1235 remain extended against at least one of the plurality of bottom connector teeth 1143.

The first bottom pin 1234 and/or the second bottom pin 1235 may retract within the bottom protruding connector 1233 in response to depressing and holding the bottom release button 1236. Thereafter, the first bottom pin 1234 and/or the second bottom pin 1235 may be extended (i.e., return to original position) in response to releasing the bottom release button 1236. Thus, the bottom fastener body 1231 may be moved to contact the second rung 11b of the ladder 11 to tighten and/or lock the bottom fastener body 1231 against the second rung 11b of the ladder 11, such that the bottom fastener body 1231 and/or the container body 1110 may be prevented from moving.

Alternatively, the bottom fastener body 1231, the bottom fastener rail 1232, and/or the bottom protruding connector 1233 may move in the first orthogonal direction or the second orthogonal direction, toward a center of the container body 1110 between the first top ladder-mounted fastener 1210 and the second top ladder-mounted fastener 1220, collectively, and the bottom ladder-mounted fastener 1230. Moreover, the bottom fastener body 1231, the bottom fastener rail 1232, and/or the bottom protruding connector 1233 may move without depressing the bottom release button 1236. However, the bottom fastener body 1231, the bottom fastener rail 1232, and/or the bottom protruding connector 1233 may only move in the aforementioned direction in absence of depressing the bottom release button 1236. In other words, moving the bottom fastener body 1231, the bottom fastener rail 1232, and/or the bottom protruding connector 1233 toward from the center of the container body 1110 may automatically retract the first bottom pin 1234 and/or the second bottom pin 1235, while moving the bottom fastener body 1231, the bottom fastener rail 1232, and/or the bottom protruding connector 1233 away from the center of the container body 1110 is prevented. Thus, the first bottom pin 1234 and/or the second bottom pin 1235 may operate similar to a ratchet. Thus, the first bottom pin 1234 and/or the second bottom pin 1235 may fully retract in response to depressing the bottom release button 1236, which allows movement of the bottom fastener body 1231, the bottom fastener rail 1232, and/or the bottom protruding connector 1233 away from the center of the container body 1110.

It is important to note that the bottom fastener body 1231, the bottom fastener rail 1232, and/or the bottom protruding connector 1233 may angularly (i.e., orthogonally, perpendicularly) move with respect to movement of the first fastener body 1211, the first fastener rail 1212, and/or the first protruding connector 1213 and/or movement of the second fastener body 1221, the second fastener rail 1222, and/or the second protruding connector 1223.

Referring again to FIG. 7, the lock 1237 is illustrated to be a key lock. However, the lock 1237 may be a combination lock, an electronic lock, and a biometric lock, but is not limited thereto.

The lock 1237 may be disposed on at least a portion of the bottom release button 1236. The lock 1237 may be activated (i.e., locked using a key, a combination) to prevent movement (i.e., depressing) the bottom release button 1236. In other words, the lock 1237 may prevent movement of the bottom fastener body 1231, the bottom fastener rail 1232, and/or the bottom protruding connector 1233 within the bottom connector track 1141. Conversely, the lock 1237 may be deactivated (i.e., unlocked using the key, the combination, a biometric scan) to allow the bottom release button 1236 to be depressed.

Thus, the lock 1237 may be used to prevent any unauthorized user from moving and/or removing the container body 1110.

Figure 8:
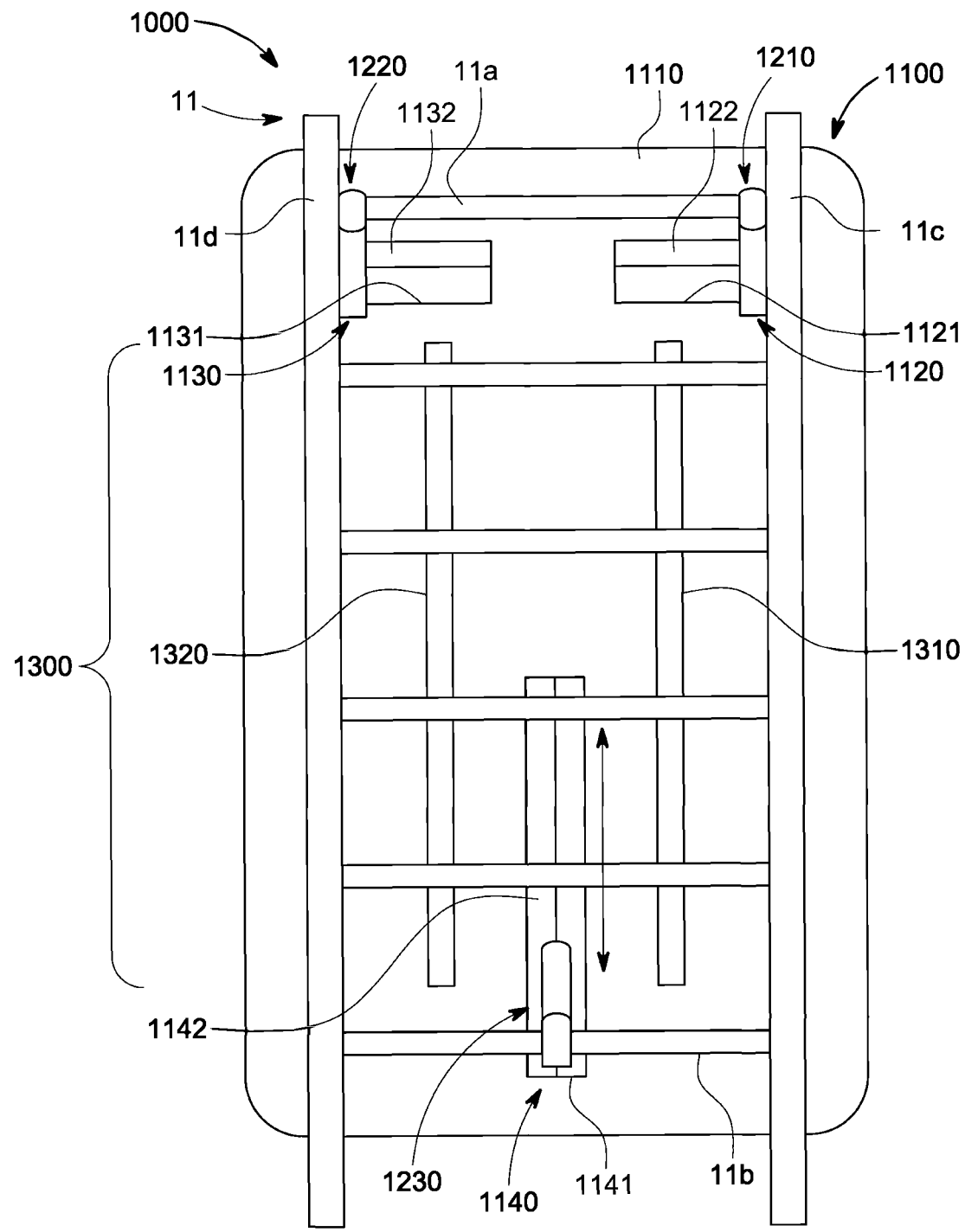
FIG. 8 illustrates an elevational rear view of the ladder-mounted storage system with the plurality of ladder-mounted fasteners as disposed on the ladder of the vehicle, according to an exemplary embodiment of the present general inventive concept.

FIG. 8 illustrates an elevational rear view of the ladder-mounted storage system with the plurality of ladder-mounted fasteners as disposed on the ladder of the vehicle, according to an exemplary embodiment of the present general inventive concept.

The plurality of reinforcement rails 1300 may include a first reinforcement rail 1310 and a second reinforcement rail 1320, but is not limited thereto.

The first reinforcement rail 1310 may include a first support body 1311 and a first protection surface 1312, but is not limited thereto.

The first support body 1311 may have an elongate shape. Moreover, the first support body 1311 may be disposed on at least a portion of the container body 1110. Also, referring again to FIGS. 6 and 7, the first support body 1311 may protrude away from the container body 1110 at a distance greater than a distance of a rear portion of the first fastener body 1211, a rear portion of the second fastener body 1221, and/or a rear portion of the bottom fastener body 1231 protrude from the container body 1110.

The first protection surface 1312 may be constructed of rubber, silicone, and/or plastic, but is not limited thereto.

The first protection surface 1312 may have an elongate shape. The first protection surface 1312 may be disposed on at least a portion of the first support body 1311. The first protection surface 1312 may absorb and/or dampen an impact thereon. As such, the first protection surface 1312 may prevent damage to the container body 1110 by the ladder 11 while disposed on the ladder 11.

The second reinforcement rail 1320 may include a second support body 1321 and a second protection surface 1322, but is not limited thereto.

The second support body 1321 may have an elongate shape. Moreover, the second support body 1321 may be disposed on at least a portion of the container body 1110. Also, referring again to FIGS. 6 and 7, the second support body 1321 may protrude away from the container body 1110 at a distance greater than a distance of a rear portion of the first fastener body 1211, a rear portion of the second fastener body 1221, and/or a rear portion of the bottom fastener body 1231 protrude from the container body 1110.

The second protection surface 1322 may be constructed of rubber, silicone, and/or plastic, but is not limited thereto.

The second protection surface 1322 may have an elongate shape. The second protection surface 1322 may be disposed on at least a portion of the second support body 1321. The second protection surface 1322 may absorb and/or dampen an impact thereon. As such, the second protection surface 1322 may prevent damage to the container body 1110 by the ladder 11 while disposed on the ladder 11.

Alternatively, with respect to the ladder-mounted storage system 1000 described above, the plurality of ladder-mounted fasteners 1200 could be separate components from the container body 1110 that could be combined (i.e., retrofit) onto any other container. This type of configuration may include additional components, such as bars and/or rods, to selectively attach and/or detach to various sides of containers that would allow any container to be used on the ladder 11.

Therefore, the ladder-mounted storage system 1000 may expand storage space for the vehicle 10 by allowing the ladder-mounted storage container 1100 to be mounted on the ladder 11. For example, the ladder-mounted storage container 1100 may store food, gas tanks, chairs, camping items, propane tanks, a propane fire ring, a barbecue stove, and a cornhole game.

The present general inventive concept may include a ladder-mounted storage system 1000, including a ladder-mounted storage container 1100 to store at least one item therein, a plurality of ladder-mounted fasteners 1200 disposed on at least a portion of the ladder-mounted storage container 1100 to removably connect the ladder-mounted storage container 1100 to a ladder 11 of a vehicle 10 and prevent movement of the ladder-mounted storage container 1100 while the plurality of ladder-mounted fasteners 1200 are locked against at least one rung 11a/11b of the ladder 11, and a plurality of reinforcement rails 1300 disposed on at least a portion of the ladder-mounted storage container 1100 to dampen an impact of the ladder-mounted storage container 1100 against the ladder 11 and prevent damage to the ladder-mounted storage container 1100 while the ladder-mounted storage container 1100 is connected to the ladder 11.

The ladder-mounted storage container 1100 may include a container body 1110, a first top fastener connector 1120 disposed within at least a portion of the container body 1110, a second top fastener connector 1130 disposed within at least a portion of the container body 1110, and at least one bottom fastener connector 1140 disposed within at least a portion of the container body 1110.

The first top fastener connector 1120 and the second top fastener connector 1130, may each include a connector track 1121/1131 to receive a fastener therein, and a plurality of connector teeth 1123/1133 disposed on at least one side of the connector track 1121/1131.

The first top fastener connector 1120 and the second top fastener connector 1130, may each further include a plurality of connector flaps 1122/1132 movably disposed on at least a portion of the connector track 1121/1131 to at least partially cover the connector track 1121/1131 therein.

The first top fastener connector 1120 and the second top fastener 1130 connector, may each further include a top receiving channel 1124/1134 disposed on a first side of the connector track 1121/1131 to form a first channel within the connector track 1121/1131, and a bottom receiving channel 1125/1135 disposed on a second side of the connector track 1121/1131 to form a second channel within the connector track 1121/1131.

The plurality of ladder-mounted fasteners 1200 may include a first top ladder-mounted fastener 1210 disposed within at least a portion of the connector track 1121/1131 to removably connect to the at least one rung 11a of the ladder 11, and a second top ladder-mounted fastener 1220 disposed within at least a portion of the connector track 1121/1131 to removably connect to the at least one rung 11a of the ladder 11.

The first top ladder-mounted fastener 1210 and the second top ladder-mounted fastener 1220 may each include a fastener body 1211/1221, a fastener rail 1212/1222 disposed on at least a portion of the fastener body 1211/1221 to removably connect the fastener body 1211/1221 to the connector track 1121/1131, a protruding connector 1213/1223 disposed on at least a portion of the fastener body 1211/1221 to connect the fastener body 1211/1221 to the fastener rail 1212/1222, a top pin 1214/1224 movably disposed on at least a portion of the protruding connector 1213/1223 to connect to at least one of the plurality of connector teeth 1123/1133 and prevent movement of at least one of the fastener body 1211/1221, the fastener rail 1212/1222, and the protruding connector 1213/1223 while the top pin 1214/1224 remains extended against at least one of the plurality of connector teeth 1123/1133, a bottom pin 1215/1225 movably disposed on at least a portion of the protruding connector 1213/1223 to connect to at least one of the plurality of connector teeth 1123/1133 and prevent movement of at least one of the fastener body 1211/1221, the fastener rail 1212/1222, and the protruding connector 1213/1223 while the bottom pin 1215/1225 remains extended against at least one of the plurality of connector teeth 1123/1133, and a top release button 1216/1226 movably disposed on at least a portion of the fastener body 1211/1221 to retract the top pin 1214/1224 and the bottom pin 1215/1225 within the protruding connector 1213/1223 in response to being depressed.

The top pin 1214/1224 and the bottom pin 1215/1225 may automatically retract in response to moving the fastener body 1211/1221, the fastener rail 1212/1222, and the protruding connector 1213/1223 in a lateral direction away from a center of the container body 1110.

The at least one bottom fastener connector 1140 may include a bottom connector track 1141 to receive a fastener therein, and a plurality of bottom connector teeth 1143 disposed on at least one side of the connector track.

The at least one bottom fastener connector 1140 may further include a plurality of bottom connector flaps 1142 movably disposed on at least a portion of the bottom connector track 1141 to at least partially cover the bottom connector track 1141 therein.

The at least one bottom fastener connector 1140 may further include a first bottom receiving channel 1144 disposed on a first side of the bottom connector track 1141 to form a first channel within the bottom connector track 1141, and a second bottom receiving channel 1145 disposed on a second side of the bottom connector track 1141 to form a second channel within the bottom connector track 1141.

The plurality of ladder-mounted fasteners 1200 may include at least one bottom ladder-mounted fastener 1230 disposed within at least a portion of the bottom connector track 1141 to removably connect to at least one second rung 11b of the ladder 11.

The at least one bottom ladder-mounted fastener 1230 may include a bottom fastener body 1231, a bottom fastener rail 1232 disposed on at least a portion of the bottom fastener body 1231 to removably connect the bottom fastener body 1231 to the bottom connector track 1141, a bottom protruding connector 1233 disposed on at least a portion of the bottom fastener body 1231 to connect the bottom fastener body 1231 to the bottom fastener rail 1232, a first bottom pin 1234 movably disposed on at least a portion of the bottom protruding connector 1233 to connect to at least one of the plurality of bottom connector teeth 1143 and prevent movement of at least one of the bottom fastener body 1231, the bottom fastener rail 1232, and the bottom protruding connector 1233 while the first bottom pin 1234 remains extended against at least one of the plurality of bottom connector teeth 1143, a second bottom pin 1235 movably disposed on at least a portion of the bottom protruding connector 1233 to connect to at least one of the plurality of bottom connector teeth 1143 and prevent movement of at least one of the bottom fastener body 1231, the bottom fastener rail 1232, and the bottom protruding connector 1233 while the bottom pin 1235 remains extended against at least one of the plurality of bottom connector teeth 1143, and a bottom release button 1236 movably disposed on at least a portion of the bottom fastener body 1231 to retract the first bottom pin 1234 and the second bottom pin 1235 within the bottom protruding connector 1233 in response to being depressed.

The first bottom pin 1234 and the second bottom pin 1235 may automatically retract in response to moving the bottom fastener body 1231, the bottom fastener rail 1232, and the bottom protruding connector 1233 in a lateral direction toward a center of the container body 1110.

The at least one bottom ladder-mounted fastener 1230 may further include a lock 1237 disposed on at least a portion of the bottom release button 1236 to prevent movement the bottom release button 1236 in response to being locked, and allow the bottom release button 1236 to be depressed in response to being unlocked.

Each of the plurality of reinforcement rails 1300 may include a support body 1311/1321 disposed on at least a portion of the container body 1110 to protrude away from the container body 1110, and a protection surface 1312/1322 disposed on at least a portion of the support body 1311/1321 to dampen an impact thereon.

The plurality of reinforcement rails 1300 may protrude away from the container body 1110 at a distance greater than a distance of a rear portion of each of the plurality of ladder-mounted fasteners 1200 protrude from the container body 1110.

At least two of the plurality of ladder-mounted fasteners 1200 may contact a different rung 11a of the ladder 11 than a third of the plurality of ladder-mounted fasteners 1200.

At least two of the plurality of ladder-mounted fasteners 1200 may move in a different direction than a third of the plurality of ladder-mounted fasteners 1200.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A ladder-mounted storage system, comprising:
   a ladder-mounted storage container to store at least one item therein;
   a plurality of ladder-mounted fasteners disposed on at least a portion of the ladder-mounted storage container to removably connect the ladder-mounted storage container to a ladder of a vehicle and prevent movement of the ladder-mounted storage container while the plurality of ladder-mounted fasteners are locked against at least one rung of the ladder; and
   a plurality of reinforcement rails disposed on at least a portion of the ladder-mounted storage container to dampen an impact of the ladder-mounted storage container against the ladder and prevent damage to the ladder-mounted storage container while the ladder-mounted storage container is connected to the ladder.

2. The ladder-mounted storage system of claim 1, wherein each of the plurality of reinforcement rails comprises:
   a support body disposed on at least a portion of the container body to protrude away from the container body; and
   a protection surface disposed on at least a portion of the support body to dampen an impact thereon.

3. The ladder-mounted storage system of claim 1, wherein the plurality of reinforcement rails protrude away from the container body at a distance greater than a distance of a rear portion of each of the plurality of ladder-mounted fasteners protrude from the container body.

4. The ladder-mounted storage system of claim 1, wherein at least two of the plurality of ladder-mounted fasteners contacts a different rung of the ladder than a third of the plurality of ladder-mounted fasteners.

5. The ladder-mounted storage system of claim 1, wherein at least two of the plurality of ladder-mounted fasteners move in a different direction than a third of the plurality of ladder-mounted fasteners.

6. The ladder-mounted storage system of claim 1, wherein the ladder-mounted storage container comprises:
   a container body;
   a first top fastener connector disposed within at least a portion of the container body;
   a second top fastener connector disposed within at least a portion of the container body; and
   at least one bottom fastener connector disposed within at least a portion of the container body.

7. The ladder-mounted storage system of claim 6, wherein the first top fastener connector and the second top fastener connector, each comprise:
   a connector track to receive a fastener therein; and
   a plurality of connector teeth disposed on at least one side of the connector track.

8. The ladder-mounted storage system of claim 7, wherein the first top fastener connector and the second top fastener connector, each further comprise:
   a plurality of connector flaps movably disposed on at least a portion of the connector track to at least partially cover the connector track therein.

9. The ladder-mounted storage system of claim 7, wherein the first top fastener connector and the second top fastener connector, each further comprise:
   a top receiving channel disposed on a first side of the connector track to form a first channel within the connector track; and
   a bottom receiving channel disposed on a second side of the connector track to form a second channel within the connector track.

10. The ladder-mounted storage system of claim 9, wherein the plurality of ladder-mounted fasteners comprises:
    a first top ladder-mounted fastener disposed within at least a portion of the connector track to removably connect to the at least one rung of the ladder; and
    a second top ladder-mounted fastener disposed within at least a portion of the connector track to removably connect to the at least one rung of the ladder.

11. The ladder-mounted storage system of claim 10, wherein the first top ladder-mounted fastener and the second top ladder-mounted fastener, each comprise:
    a fastener body;
    a fastener rail disposed on at least a portion of the fastener body to removably connect the fastener body to the connector track;
    a protruding connector disposed on at least a portion of the fastener body to connect the fastener body to the fastener rail;
    a top pin movably disposed on at least a portion of the protruding connector to connect to at least one of the plurality of connector teeth and prevent movement of at least one of the fastener body, the fastener rail, and the protruding connector while the top pin remains extended against at least one of the plurality of connector teeth;
    a bottom pin movably disposed on at least a portion of the protruding connector to connect to at least one of the plurality of connector teeth and prevent movement of at least one of the fastener body, the fastener rail, and the protruding connector while the bottom pin remains extended against at least one of the plurality of connector teeth; and
    a top release button movably disposed on at least a portion of the fastener body to retract the top pin and the bottom pin within the protruding connector in response to being depressed.

12. The ladder-mounted storage system of claim 11, wherein the top pin and the bottom pin automatically retract in response to moving the fastener body, the fastener rail, and the protruding connector in a lateral direction away from a center of the container body.

13. The ladder-mounted storage system of claim 6, wherein the at least one bottom fastener connector comprises:
    a bottom connector track to receive a fastener therein; and
    a plurality of bottom connector teeth disposed on at least one side of the connector track.

14. The ladder-mounted storage system of claim 13, wherein the at least one bottom fastener connector further comprises:
    a plurality of bottom connector flaps movably disposed on at least a portion of the bottom connector track to at least partially cover the bottom connector track therein.

15. The ladder-mounted storage system of claim 13, wherein the at least one bottom fastener connector further comprises:
    a first bottom receiving channel disposed on a first side of the bottom connector track to form a first channel within the bottom connector track; and a second bottom receiving channel disposed on a second side of the bottom connector track to form a second channel within the bottom connector track.

16. The ladder-mounted storage system of claim 15, wherein the plurality of ladder-mounted fasteners comprises:
at least one bottom ladder-mounted fastener disposed within at least a portion of the bottom connector track to removably connect to at least one second rung of the ladder.

17. The ladder-mounted storage system of claim 16, wherein the at least one bottom ladder-mounted fastener comprises:
a bottom fastener body;
a bottom fastener rail disposed on at least a portion of the bottom fastener body to removably connect the bottom fastener body to the bottom connector track;
a bottom protruding connector disposed on at least a portion of the bottom fastener body to connect the bottom fastener body to the bottom fastener rail;
a first bottom pin movably disposed on at least a portion of the bottom protruding connector to connect to at least one of the plurality of bottom connector teeth and prevent movement of at least one of the bottom fastener body, the bottom fastener rail, and the bottom protruding connector while the first bottom pin remains extended against at least one of the plurality of bottom connector teeth;
a second bottom pin movably disposed on at least a portion of the bottom protruding connector to connect to at least one of the plurality of bottom connector teeth and prevent movement of at least one of the bottom fastener body, the bottom fastener rail, and the bottom protruding connector while the bottom pin remains extended against at least one of the plurality of bottom connector teeth; and
a bottom release button movably disposed on at least a portion of the bottom fastener body to retract the first bottom pin and the second bottom pin within the bottom protruding connector in response to being depressed.

18. The ladder-mounted storage system of claim 17, wherein the first bottom pin and the second bottom pin automatically retract in response to moving the bottom fastener body, the bottom fastener rail, and the bottom protruding connector in a lateral direction toward a center of the container body.

19. The ladder-mounted storage system of claim 17, wherein the at least one bottom ladder-mounted fastener further comprises:
a lock disposed on at least a portion of the bottom release button to prevent movement the bottom release button in response to being locked, and allow the bottom release button to be depressed in response to being unlocked.

* * * * *